US010800226B2

(12) United States Patent
Shimoyama et al.

(10) Patent No.: US 10,800,226 B2
(45) Date of Patent: Oct. 13, 2020

(54) AIR CONDITIONING UNIT FOR VEHICLE HAVING AIR CONDITIONING CASE WITH BACKFLOW PREVENTION RIB

(71) Applicant: DENSO CORPORATION, Kariya, Aichi-pref. (JP)

(72) Inventors: Yohei Shimoyama, Kariya (JP); Masayuki Narita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 127 days.

(21) Appl. No.: 16/078,791

(22) PCT Filed: Jan. 25, 2017

(86) PCT No.: PCT/JP2017/002495
§ 371 (c)(1),
(2) Date: Aug. 22, 2018

(87) PCT Pub. No.: WO2017/145620
PCT Pub. Date: Aug. 31, 2017

(65) Prior Publication Data
US 2019/0047351 A1 Feb. 14, 2019

(30) Foreign Application Priority Data
Feb. 24, 2016 (JP) ................. 2016-033498

(51) Int. Cl.
*B60H 1/00* (2006.01)
*B60H 1/32* (2006.01)
*F24F 13/22* (2006.01)

(52) U.S. Cl.
CPC ....... *B60H 1/0055* (2013.01); *B60H 1/00514* (2013.01); *B60H 1/3233* (2013.01);
(Continued)

(58) Field of Classification Search
CPC ............. B60H 1/0055; B60H 1/00514; B60H 1/3233; B60H 1/3227; B60H 1/00207;
(Continued)

(56) References Cited

U.S. PATENT DOCUMENTS 5,321,958 A * 6/1994 Kim ....................... F25D 17/04
62/272
6,478,083 B1 * 11/2002 Nanba ................ B60H 1/00514
165/202

FOREIGN PATENT DOCUMENTS

| JP | H07025224 A | 1/1995 |
|---|---|---|
| JP | H11192834 A | 7/1999 |

(Continued)

*Primary Examiner* — Steve S Tanenbaum
(74) *Attorney, Agent, or Firm* — Harness, Dickey & Pierce, P.L.C.

(57) ABSTRACT

An air conditioning unit for a vehicle includes an air conditioning case, a blower, a cooler including a core, and a drain port that drains condensed water generated in the cooler from the air conditioning case. A bottom surface of the air conditioning case defines a drain path extending from a boundary between the blower and the air conditioning case to the drain port. The drain path is inclined downward toward the drain port. A backflow prevention rib protrudes from the bottom surface to extend along a direction intersecting with a width direction of the air conditioning case. The backflow prevention rib is configured to guide the condensed water to the drain port. The backflow prevention rib is located below a virtual line that extends from the boundary to a lower end of an upstream surface of the core.

8 Claims, 7 Drawing Sheets

V—V

(52) U.S. Cl.
CPC .......... *F24F 13/22* (2013.01); *B60H 1/00207* (2013.01); *B60H 1/00557* (2013.01); *B60H 2001/00214* (2013.01)

(58) Field of Classification Search
CPC ....... B60H 1/00557; B60H 2001/00214; F24F 13/22
USPC .......................................................... 62/272
See application file for complete search history.

(56) References Cited

FOREIGN PATENT DOCUMENTS

| | | |
|---|---|---|
| JP | 2001213142 A | 8/2001 |
| JP | 2002029252 A | 1/2002 |

\* cited by examiner

IV—Q—R—IV

V–V

IV—Q—R—IV

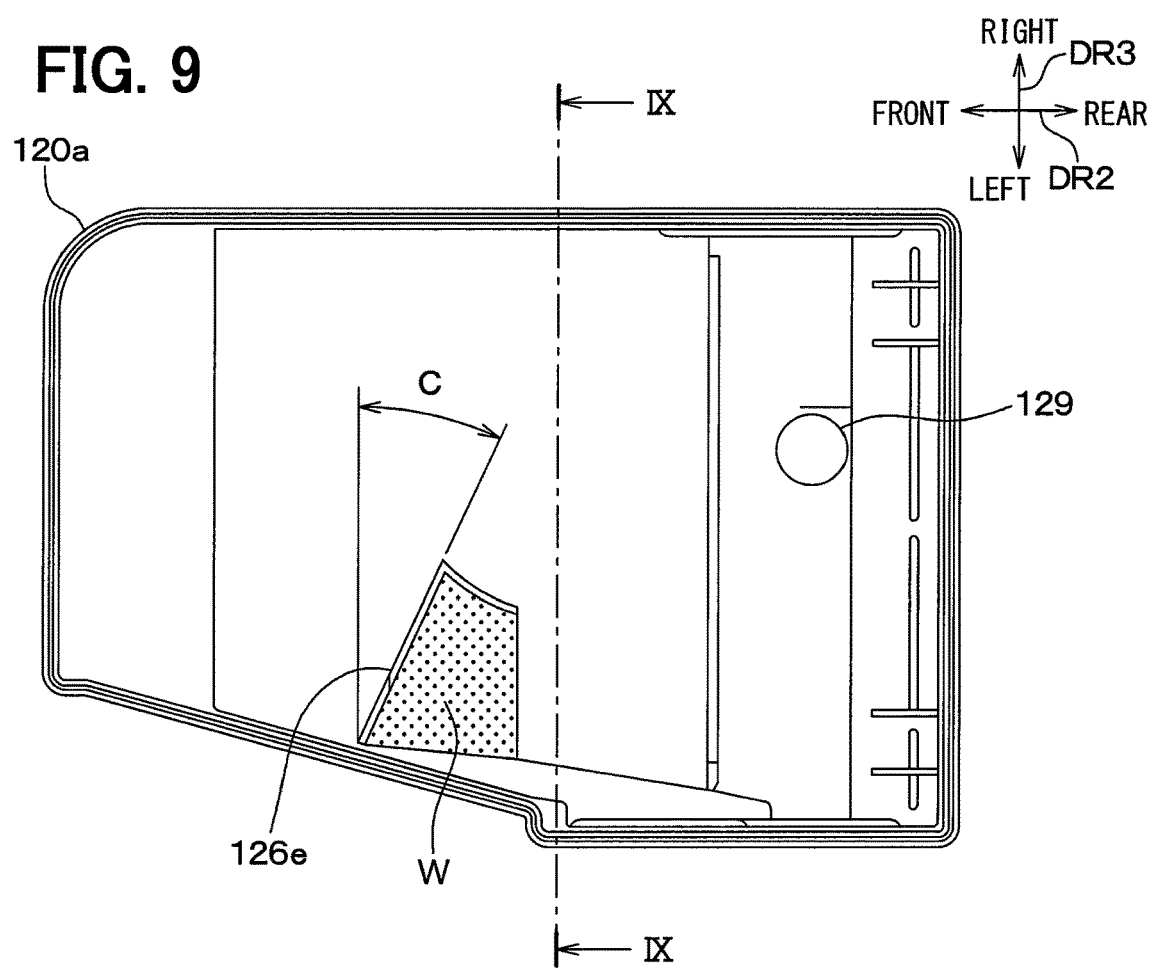
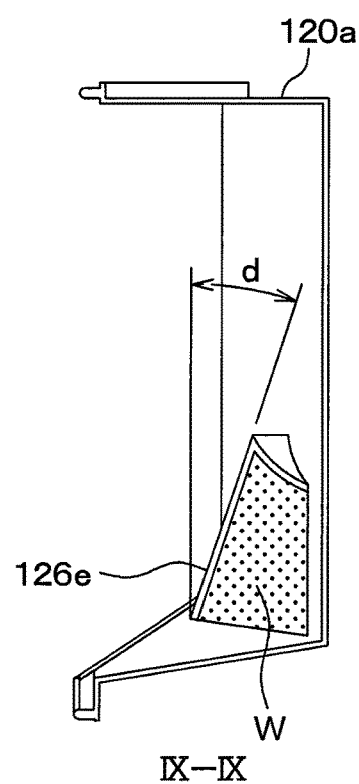

AIR CONDITIONING UNIT FOR VEHICLE HAVING AIR CONDITIONING CASE WITH BACKFLOW PREVENTION RIB

CROSS REFERENCE TO RELATED APPLICATIONS

This application is a U.S. National Phase Application under 35 U.S.C. 371 of International Application No. PCT/JP2017/002495 filed on Jan. 25, 2017 and published in Japanese as WO/2017/145620 A1 on Aug. 31, 2017. This application is based on and claims the benefit of priority from Japanese Patent Application No. 2016-033498 filed on Feb. 24, 2016. The entire disclosures of all of the above applications are incorporated herein by reference.

TECHNICAL FIELD

The present disclosure relates to an air conditioning unit for a vehicle that is arranged inside a center console in a vehicle compartment.

BACKGROUND ART

Air conditioning units are known to be mounted to a vehicle. For example, Patent Literature 1 discloses an air conditioning unit for a vehicle included in an air conditioner for a vehicle. The air conditioning unit includes a first case housing a blower, a second case housing a cooler, and a duct connecting the first case and the second case to each other. The duct is inclined downward gradually from the first case to the second case. In the air conditioning unit, the duct includes a bottom surface provided with a guide wall serving as a backflow block portion. The guide wall blocks a backflow of condensed water, which is generated in an evaporator inside the second case, toward the first case and therefore preventing the condensed water from flowing into the blower.

The air conditioning unit for a vehicle may be arranged in the center console of the vehicle to supply air toward a rear seat in the vehicle compartment. Generally, such air conditioning unit is designed to have a short width in an up-down direction of the vehicle and is arranged so that a bottom surface of the air conditioning unit is positioned horizontally so that an interior space of the vehicle compartment is secured large. As such, when condensed water is generated in a cooler that is configured to cool air from the blower, the condensed water may be stored easily on the bottom surface of the air conditioning unit.

Further, when the air conditioning unit is arranged in the center console of the vehicle, the cooler may be arranged proximate to the blower. Therefore, the condensed water on the bottom surface may flow backward and flow into the blower when the condensed water is accelerated frontward in a front-rear direction of the vehicle. For example, the condensed water may accelerated frontward when the vehicle travels on a down grade, when the vehicle is braked suddenly, or when the vehicle is turned quickly.

Then, the air conditioning unit disclosed in Patent Literature includes the guide wall provided with the bottom surface of the duct to suppress the cause of the backflow of the condensed water.

PRIOR ART LITERATURE

Patent Literature

Patent Literature 1: JP 2002-29252 A

SUMMARY OF INVENTION

However, the inventors of the present disclosure studied and found that the guide wall of the air conditioning unit in Patent Literature 1 may cause ventilation resistance with air passing through the duct, and therefore a volume of air supplied into the vehicle compartment may be decreased.

It is an objective of the present disclosure to provide an air conditioning unit in a center console of the vehicle that can drain condensed water certainly and that can suppress a cause of a backflow of the condensed water toward a blower without reducing a volume of air supplied into a vehicle compartment.

In an aspect of the present disclosure, an air conditioning unit for a vehicle in a center console positioned in a vehicle compartment includes an air conditioning case, a cooler in the air conditioning case, and a drain port. The air conditioning case defines an air passage therein through which air flows toward the vehicle compartment. The blower is configured to supply air into the air passage. The cooler includes a core that is configured to cool the air flowing through the air conditioning case. The drain port is defined in a bottom surface of the air conditioning case and is configured to drain a condensed water, which is generated in the cooler, from the air conditioning case. The bottom surface of the air conditioning case defines a drain path extending from a boundary between the blower and the air conditioning case to the drain port. The drain path is inclined downward toward the drain port. The bottom surface of the air conditioning case is provided with a backflow prevention rib that is configured to guide the condensed water to the drain port and to block a backflow of the condensed water toward the blower. When a width direction of the bottom surface of the air conditioning duct is defined to be perpendicular to a main flow direction of the air flowing through the air conditioning case, the backflow prevention rib protrudes from the bottom surface to extend along a direction intersecting with the width direction. The core includes an upstream surface in a flow direction of the air flowing through the air conditioning case. The backflow prevention rib is located below a virtual line that extends from the boundary, which is defined in the bottom surface of the air conditioning case, to a lower end of the upstream surface of the core.

According to the above-described configuration, the bottom surface of the air conditioning case defines the drain path extending from the boundary between the blower and the air conditioning case to the drain port. The drain path is inclined downward toward the drain port. In addition, the backflow prevention rib is provided. The backflow prevention rib protrudes from the bottom surface of the air conditioning case to extend along a direction intersecting with a width direction of the air conditioning case. The backflow prevention rib is configured to guide the condensed water to the drain port and suppress a cause of a backflow of the condensed water toward the blower. Here, the width direction of the bottom surface of the air conditioning case is defined as a width direction of the air conditioning case intersecting with the main flow direction of air flowing through the air conditioning case. As such, the condensed water can be drained certainly while a cause of a backflow of the condensed water toward the blower is suppressed. In addition, the core includes an upstream surface in a flow direction of the air flowing through the air conditioning case. The backflow prevention rib is located below a virtual line that extends from the boundary, which is defined in the bottom surface of the air conditioning case, to a lower end of the upstream surface of the core. As a result, a volume of air supplied into the vehicle compartment can be prevented from being reduced.

BRIEF DESCRIPTION OF DRAWINGS

FIG. 9 is a diagram showing a backflow prevention rib, which is provided in a bottom surface of an air conditioning case, preventing condensed water from flowing backward toward a blower.

FIG. 10 is a right-side view of the backflow prevention rib, shown in FIG. 9, storing the condensed water.

DESCRIPTION OF EMBODIMENTS

Figure 1:
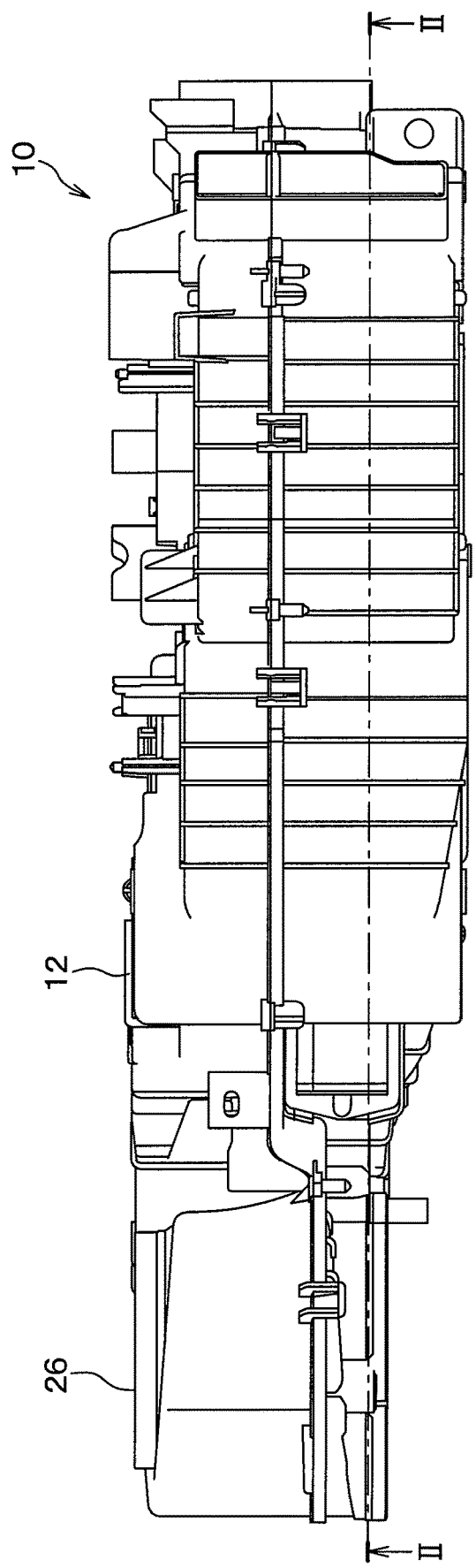
FIG. 1 is an exterior view of an air conditioning unit for a vehicle in a first embodiment.

Hereinafter, embodiments will be described with reference to the drawings. In the following embodiments, the same or equivalent parts are denoted by the same reference numerals as each other, and explanations will be provided to the same reference numerals.

First Embodiment

Figure 2:
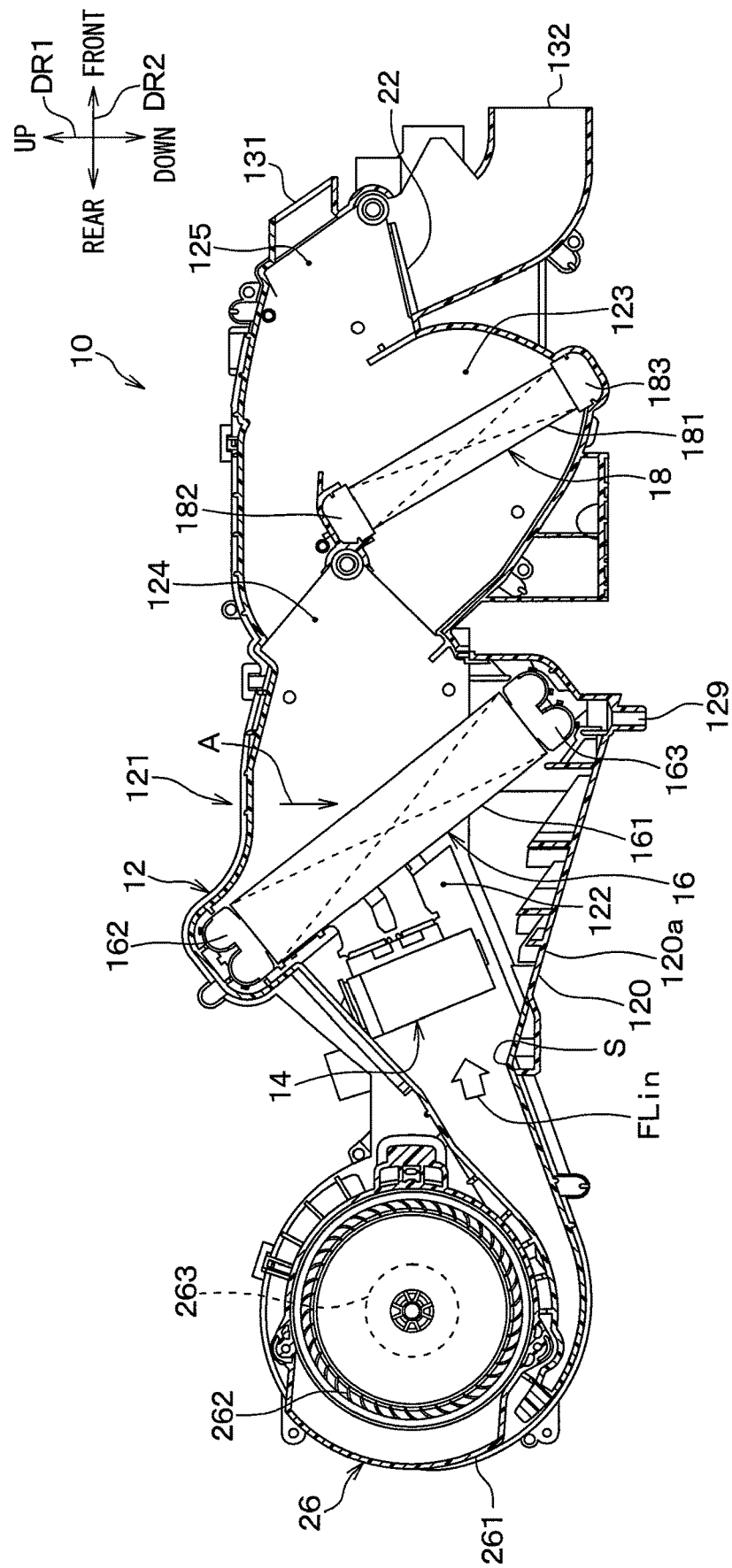
FIG. 2 is a cross-sectional view taken along a line II-II shown in FIG. 1.
Figure 3:
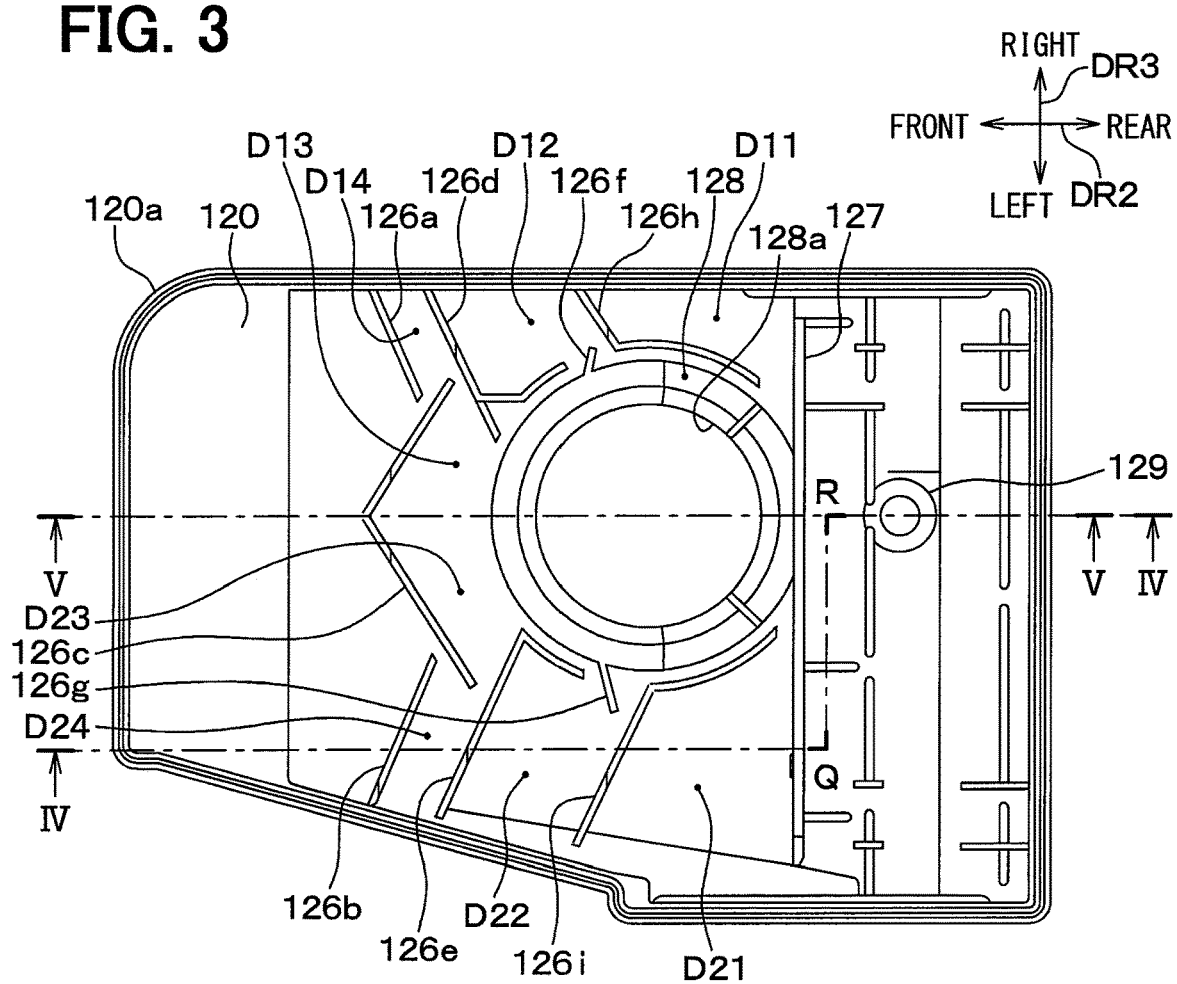
FIG. 3 is a view as an orientation indicator A shown in FIG. 2 and shows a bottom surface of a lower case without an evaporator and an expansion valve.

An air conditioning unit for a vehicle in a first embodiment will be described hereafter with reference to FIG. 1 to FIG. 11. FIG. 1 is an exterior view of an air conditioning unit 10 for a vehicle in the first embodiment. In the present embodiment, the air conditioning unit 10 for a vehicle may be arranged in a center console of the vehicle to supply air toward a rear seat in the vehicle compartment. The air conditioning unit 10 for a vehicle is designed to have a relatively short dimension in an up-down direction of the vehicle so that an interior space of the vehicle compartment is secured large. FIG. 2 is a cross-sectional view taken along a line II-II shown in FIG. 1. For ease of description, orientation indicator DR1 or DR2 showing the up-down direction and the front-rear direction are provided in FIG. 2 with the air conditioning unit 10 mounted to the vehicle. That is, the orientation indicator DR1 shows an up-down direction DR1 of the vehicle, and the orientation indicator DR2 shows a front-rear direction DR2 of the vehicle, in FIG. 1. In FIG. 3, the orientation indicator DR3 shows a width direction DR3 of the vehicle. The width direction DR3 is, i.e., a left-right direction DR3 of the vehicle. The up-down direction DR1, the front-rear direction DR2, and the vehicle width direction DR3 are perpendicular to each other.

As shown in FIG. 2, the air conditioning unit 10 includes an air conditioning case 12, an expansion valve 14, an evaporator 16, a heater core 18, an outlet door 22, and a blower 26.

The blower 26 is a centrifugal blower. Specifically, the blower 26 is connected to an upstream end of the air conditioning case 12 and is configured to discharge air into the air conditioning case 12. The blower 26 includes a blower case 261, a centrifugal fan 262 in the blower case 261, and a fan motor 263. The blower case 261 is coupled with the air conditioning case 12. The centrifugal fan 262 draws air and discharges the air when being rotated. The fan motor 263 rotates the centrifugal fan 262. When the centrifugal fan 262 rotates, the blower 26 discharges the air toward the evaporator 16 housed in the air conditioning case 12 as shown by an orientation indicator FLin.

The air conditioning case 12 is made of resin. The air conditioning case 12, together with the blower case 261, configures a housing of the air conditioning unit 10. The air conditioning case 12 is configured by a left case and a right case coupled with each other. The air conditioning case 12 defines, as an air passage, a case passage 121 therein. The case passage 121 allows the air to flow therein toward the vehicle compartment. The case passage 121 is subdivided by a structure provided in the air conditioning case 12. That is, the case passage 121 is divided into an upstream air passage 122, a warm air passage 123, a cool air passage 124, and an air mixing space 125.

The upstream air passage 122 includes an upstream end connected to an outlet of the blower 26 and a downstream end connected to the warm air passage 123 and the cool air passage 124. That is, the warm air passage 123 and the cool air passage 124 each are connected to the downstream end of the upstream air passage 122 and are in parallel to each other. As such, the cool air passage 124 serves as a bypass passage that allows the air from the upstream air passage 122 to flow therethrough while bypassing the warm air passage 123. In the present embodiment, the cool air passage 124 is located above the warm air passage 123.

The air mixing space 125 is a space connected to a downstream end of the warm air passage 123 and a downstream end of the cool air passage 124. As such, the air after passing through the warm air passage 123 and the air after passing through the cool air passage 124 are mixed with each other in the air mixing space 125.

The evaporator 16, together with a compressor, a condenser, and the expansion valve 14, configures a well-known refrigeration cycle device configured to circulate the refrigerant. The evaporator 16 is configured to perform a heat exchange between a refrigerant decompressed in the expansion valve 14 and a supply air from the blower 26 so as to evaporate the refrigerant and to cool the supply air.

The evaporator 16 is positioned in the upstream air passage 122. That is, the evaporator 16 serves as a cooler that is configured to cool air flowing through the upstream air passage 122. Accordingly, the evaporator 16 cools the air, which flows into the upstream air passage 122 from the blower 26 as indicated by the orientation indicator FLin, and allows the cooled air to at least one of the warm air passage 123 and the cool air passage 124.

The evaporator 16 has a configuration similar to that of evaporators generally mounted to air conditioners for a vehicle. Specifically, the evaporator 16 includes a core 161, a first header tank 162, and a second header tank 163. The first header tank 162 and the second header tank 163 are coupled to two ends of the core 161 facing each other respectively. The evaporator 16 is arranged in the upstream air passage 122 so that the first header tank 162 is located above the second header tank 163. That is, the first header tank 162 serves as an upper end of the evaporator 16, and the second header tank 163 serves as a lower end of the evaporator 16.

In the present embodiment, the second header tank 163 also serves as a bottom portion defining a bottom end of the core 161. In the present embodiment, the evaporator 16 is arranged so that the second header tank 163 as the bottom portion is inclined toward a downstream side of the core 161 in a flow direction of air.

The core 161 of the evaporator 16 includes a plurality of refrigerant tubes and a plurality of corrugated fins. The refrigerant tubes each have a flat shape in cross section and are in communication with the first header tank 162 and the second header tank 163. The corrugated fins each have a corrugated shape and each are interposed between adjacent two tubes of the refrigerant tubes. Specifically, the core 161 has a structure in which the refrigerant tubes and the corrugated fins are stacked alternately with each other.

In the evaporator 16, the refrigerant having a low temperature and flowing through the refrigerant tubes exchanges heat with the air passing through the core 161, whereby the air is cooled. In the present embodiment, the refrigerant tubes of the evaporator 16 each are arranged to be inclined with respect to the up-down direction DR 1.

The evaporator 16 cools air, therefore may generate condensed water. The air conditioning case 12 includes a bottom surface 120 provided with a drain port 129 and is configured to drain the condensed water, which is generated in the evaporator 16, from the air conditioning case 12 via the drain port 129. In other words, the drain port 129 is configured to drain the condensed water generated in the evaporator 16 from the air conditioning case 12.

The heater core 18 is arranged in the warm air passage 123. That is, the heater core 18 is a heating heat exchanger, i.e., a heater, configured to heat the air, which flows out of the evaporator 16 and flows through the warm air passage 123, with engine cooling water. The engine cooling water may be warm water. For example, the heater core 18 is arranged in the warm air passage 123 so that all of the air flowing through the warm air passage 123 passes through the heater core 18.

The structure of the heater core 18 is the same as that of a well-known heating heat exchanger mounted to an air conditioner for a vehicle. Specifically, the heater core 18 includes a core 181, a first header tank 182, and a second header tank 183. The first header tank 182 and the second header tank 183 are connected to one end and the other end of the core 181 respectively. The heater core 18 is arranged in the warm air passage 123 so that the first header tank 182 is located above the second header tank 183. That is, the first header tank 182 serves as an upper end of the heater core 18, and the second header tank 183 serves as a lower end of the heater core 18.

The core 181 of the heater core 18 includes a plurality of warm water tubes and a plurality of corrugated fins. The warm water tubes each have a flat shape in cross section and are in communication with the first header tank 182 and the second header tank 183. The corrugated fins each have a corrugated shape and each are interposed between adjacent two tubes of the warm water tubes. Specifically, the core 181 has a structure in which the warm water tubes and the corrugated fins are stacked alternately with each other. According to this structure, the core 181 allows the air, which flows into the core 181, to pass therethrough while being heated. In the present embodiment, the warm water tubes of the heater core 18 each are arranged to be inclined with respect to the up-down direction DR1.

The warm air, which is heated while passing through the warm air passage 123, and the cool air, which passes through the cool air passage 124, are mixed in the air mixing space 125 and flows into the vehicle compartment. The air mixing space 125 is defined in the air conditioning case 12 to be in fluid communication with both of the warm air passage 123 and the cool air passage 124.

As shown in FIG. 2, the air conditioning case 12 includes air outlets 131, 132 that discharge the conditioned air of which temperature is adjusted. The air outlets 131, 132 each are connected to the air mixing space 125 so that the conditioned air after passing through the air mixing space 125 is discharged into the vehicle compartment via at least one of the air outlets 131, 132.

For example, the air outlets 131, 132 may be a face outlet 131 and a foot outlet 132. The face outlet 131 the conditioned air toward an upper body of the occupant having the rear seat. The foot outlet 132 discharges the conditioned air toward feet of an occupant having a rear seat. The conditioned air is supplied into the vehicle compartment from the face outlet 131 and/or the foot outlet 132 being opened.

Figure 4:
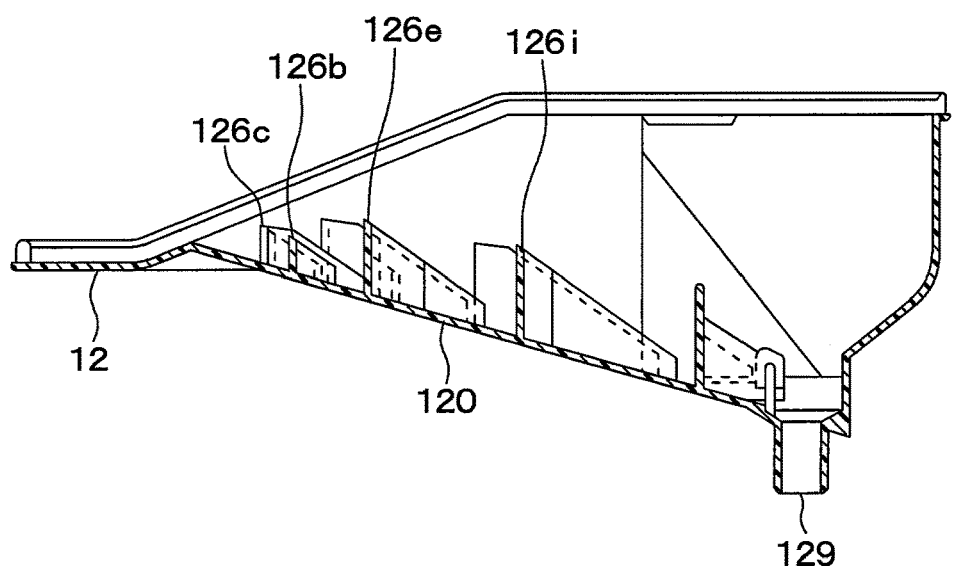
FIG. 4 is a cross-sectional view taken along a line IV-Q-R-IV shown in FIG. 3.
Figure 5:
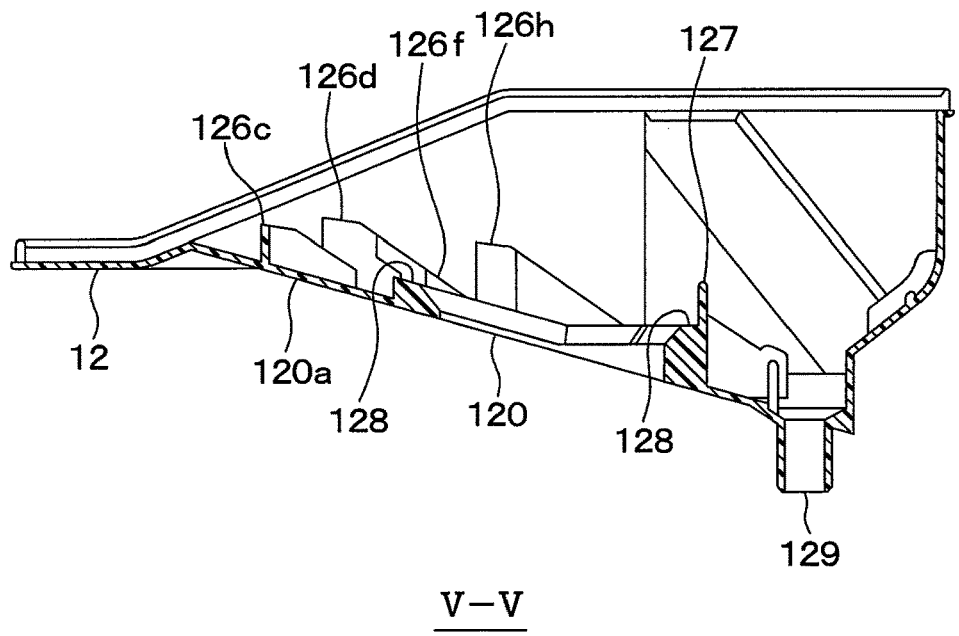
FIG. 5 is a cross-sectional view taken along a line V-V shown in FIG. 3.
Figure 6:
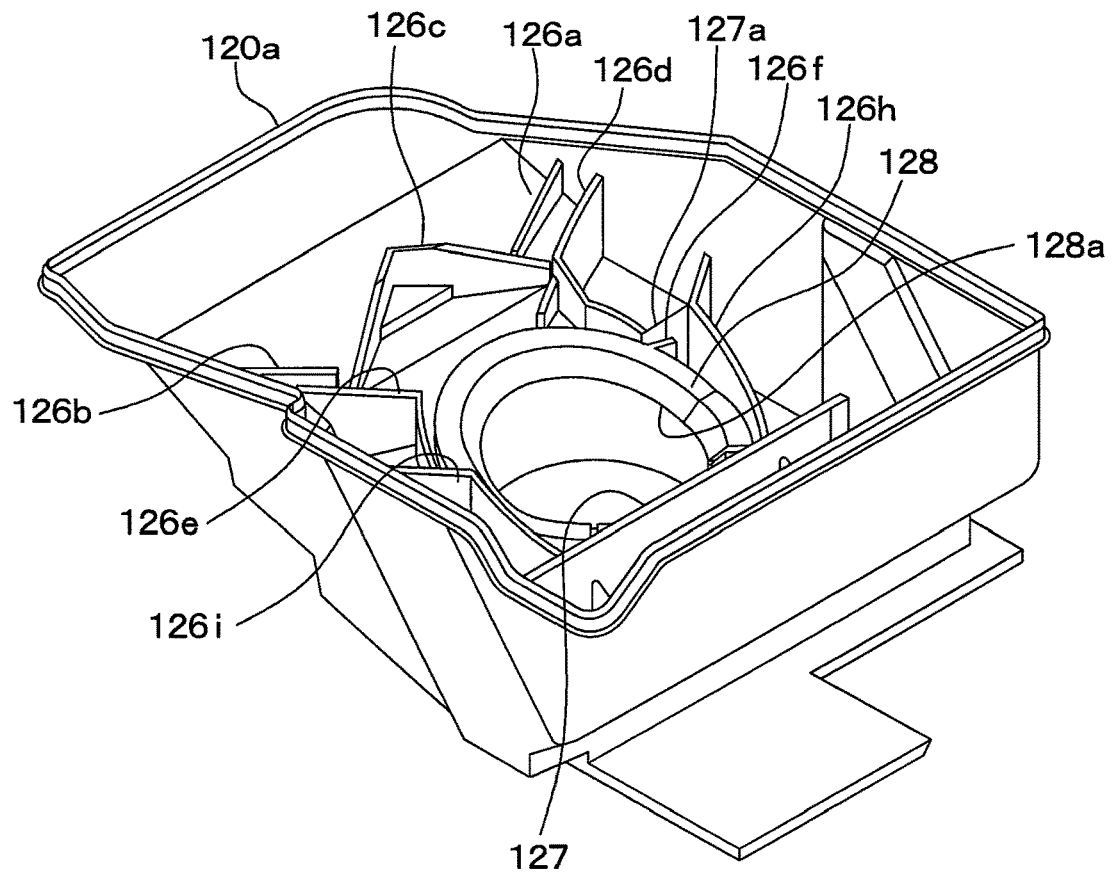
FIG. 6 is a perspective view of the lower case.
Figure 7:
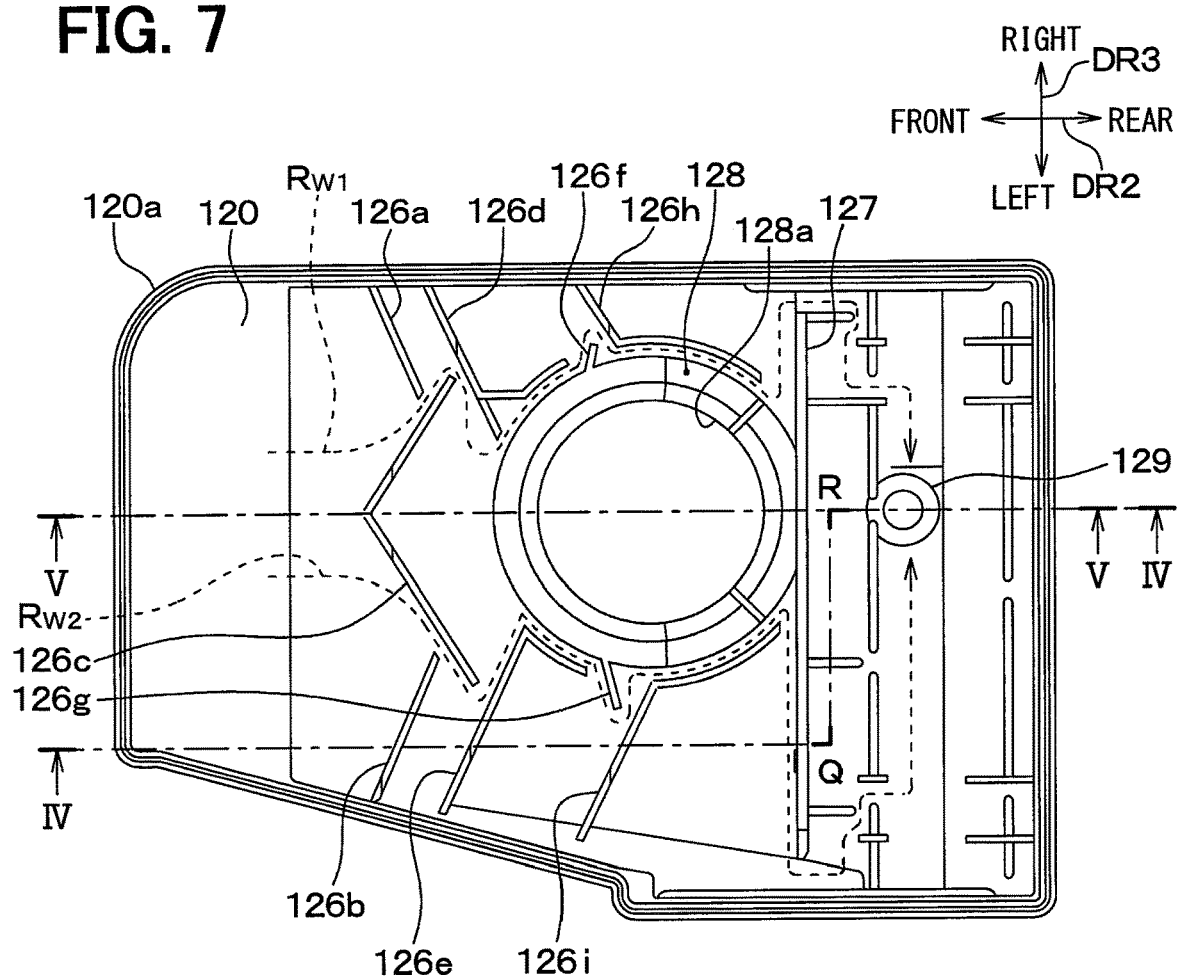
FIG. 7 is a view of the lower case when viewed as orientation indicator A shown in FIG. 2 and shows flows of condensed water.
Figure 8:
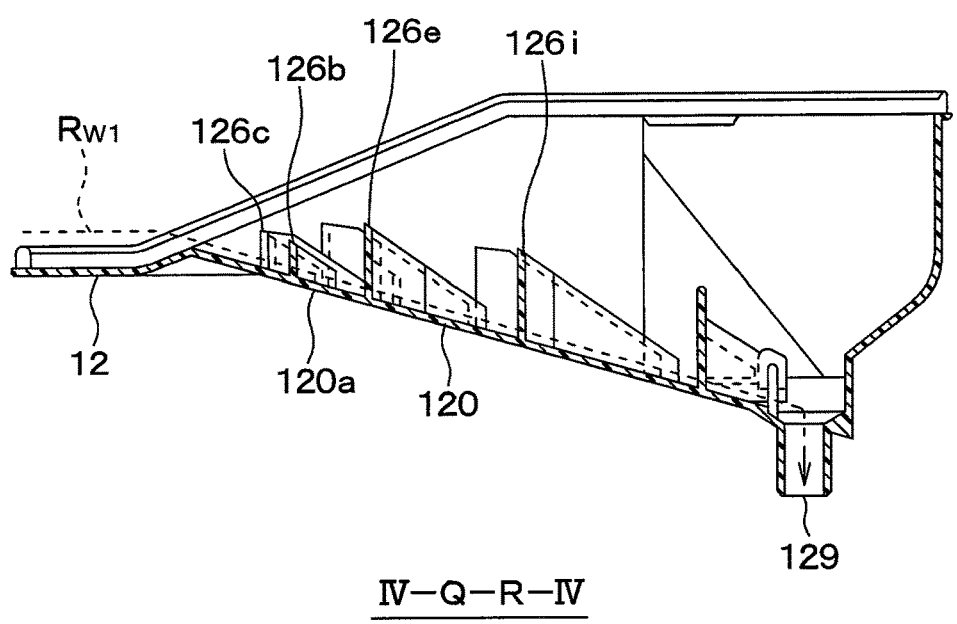
FIG. 8 is a cross-sectional view taken along a line IV-Q-R-IV and shows flows of condensed water.

As shown in FIG. 2, a lower portion of the air conditioning case 12 defines an opening, and a lower case 120a is attached to the air conditioning case 12 to close the opening. The bottom surface 120 of the air conditioning case 12 is defined by a part of the air conditioning case 12 and the lower case 120a. FIG. 3 is a view along an orientation indicator A shown in FIG. 2 and shows a bottom surface of the lower case 120a without the evaporator 16 and the expansion valve 14. FIG. 4 is a cross-sectional view taken along a line IV-Q-R-IV shown in FIG. 3. FIG. 5 is a cross-sectional view taken along a line V-V shown in FIG. 3. FIG. 6 is a perspective view of the lower case.

The bottom surface 120 of the air conditioning case 12 includes the drain port 129, a connector-block attachment hole 128a, a backflow prevention ribs 126a-126i, and an air inflow prevention rib 127. The backflow prevention ribs 126a-126i each may be a thin plate in shape. In the present embodiment, the backflow prevention ribs 126a-126i each has a rectangular shape in cross section.

The bottom surface 120 of the air conditioning case 12 defines a drain path extending from a boundary S between the blower 26 and the air conditioning case 12 to the drain port 129. The drain path is inclined downward toward the drain port 129.

The drain port 129 is configured to drain the condensed water, which is generated in the evaporator 16, from the air conditioning case 12 and may be referred to as an outlet. When the condensed water is stored on the bottom surface 120 of the air conditioning case 12, the drain port 129 drains the condensed water from the vehicle.

The connector-block attachment hole 128a is a hole that is defined to fix a connector block (not shown) for piping of an air conditioner. An outer peripheral portion 128 is formed along a rim defining the connector-block attachment hole 128a. The outer peripheral portion 128 extends from the bottom surface 120 of the air conditioning case 12. The connector-block attachment hole 128a is closed when the connector block for the piping of the air conditioner is attached.

The backflow prevention ribs 126a-126i protrude from the bottom surface 120 of the air conditioning case 12. The backflow prevention ribs 126a-126i are configured to guide the condensed water, which is generated in the evaporator 16 and flows to the bottom surface 120 of the air conditioning case 12, to the drain port 129 and suppress a cause of a backflow of the condensed water toward the blower 26. Hereinafter, the width direction of the bottom surface 120 of the air conditioning case 12 is defined as a width direction of the air conditioning case 12 intersecting with the main flow direction of air flowing through the air conditioning case 12.

Here, the air conditioning case 12 includes one side and an other side facing each other in the width direction and includes a center in the width direction. The backflow prevention rib 126a extends from the one side of the air conditioning case 12 toward the center of the air conditioning case 12. Specifically, the backflow prevention rib 126a extends from the one side of the air conditioning case 12 along a direction intersecting with the width direction of the air conditioning case 12. More specifically, a distance between the backflow prevention rib 126a and the drain port 129 in the front-rear direction decreases as the backflow prevention rib 126a extends from the one side of the air conditioning case 12 to the center of the air conditioning case 12.

The backflow prevention rib 126b extends from the other side of the air conditioning case 12 toward the center of the air conditioning case 12. Specifically, the backflow prevention rib 126b extends from the other side of the air conditioning case 12 along a direction intersecting with the width direction of the air conditioning case 12. More specifically, a distance between the backflow prevention rib 126b and the drain port 129 in the front-rear direction decreases as the backflow prevention rib 126b extends from the other side of the air conditioning case 12 to the center of the air conditioning case 12.

The backflow prevention rib 126c is positioned between the backflow prevention rib 126a and the backflow prevention rib 126b. The backflow prevention rib 126c includes a portion extending from the center of the air conditioning case 12 toward the one side of the air conditioning case 12 and a portion extending from the center of the air conditioning case 12 toward the other side of the air conditioning case 12. The backflow prevention rib 126a and the backflow prevention rib 126c are spaced away from each other by about several millimeters and thereby defining a gap therebetween. The backflow prevention rib 126b and the backflow prevention rib 126c are spaced away from each other by about several millimeters and thereby defining a gap therebetween.

The backflow prevention rib 126d is positioned downstream of the backflow prevention rib 126a along the flow direction of the air flowing through the air conditioning case 12. The backflow prevention rib 126d includes a portion, which extends from the one side of the air conditioning case 12 to the center of the air conditioning case 12, and a branched portion, which is branched from the portion and extends along the outer peripheral portion 128. The backflow prevention rib 126d and the backflow prevention rib 126c are spaced away from each other by about several millimeters and thereby defining a gap therebetween. The backflow prevention rib 126d and the outer peripheral portion 128 are spaced away from each other by about several millimeters and thereby defining a gap therebetween.

The backflow prevention rib 126e is positioned downstream of the backflow prevention rib 126a along the flow direction of the air flowing through the air conditioning case 12. The backflow prevention rib 126e includes a portion, which extends from the other side of the air conditioning case 12 to the center of the air conditioning case 12, and a branched portion, which is branched from the portion and extends along the outer peripheral portion 128. The backflow prevention rib 126e and the backflow prevention rib 126c are spaced away from each other by about several millimeters and thereby defining a gap therebetween. The backflow prevention rib 126e and the outer peripheral portion 128 are spaced away from each other by about several millimeters and thereby defining a gap therebetween.

The backflow prevention rib 126f extends from an outer surface of the outer peripheral portion 128 adjacent to the backflow prevention rib 126e toward the one side of the air conditioning case 12. A distance between he backflow prevention rib 126f and the drain port 129 in the front-rear direction decreases as the backflow prevention rib 126f extends toward the one side of the air conditioning case 12. The backflow prevention rib 126f and the backflow prevention rib 126d are spaced away from each other by about several millimeters and thereby defining a gap therebetween. The backflow prevention rib 126f and the backflow prevention rib 126h are spaced away from each other by about several millimeters and thereby defining a gap therebetween.

The backflow prevention rib 126g extends from an outer surface of the outer peripheral portion 128 adjacent to the backflow prevention rib 126i toward the other side of the air conditioning case 12. A distance between he backflow prevention rib 126g and the drain port 129 in the front-rear direction decreases as the backflow prevention rib 126g extends toward the other side of the air conditioning case 12. The backflow prevention rib 126g and the backflow prevention rib 126e are spaced away from each other by about several millimeters and thereby defining a gap therebetween. The backflow prevention rib 126g and the backflow prevention rib 126i are spaced away from each other by about several millimeters and thereby defining a gap therebetween.

The backflow prevention rib 126f together with the backflow prevention rib 126g serves as a guide rib that is configured to guide the condensed water, which flows backward toward the blower 26, to flow through a plurality of water storage chambers D11-D14, D21-D24 sequentially from one of the water storage chambers D11-D14, D21-D24 adjacent to the drain port 129 to another one of the water storage chambers D11-D14, D21-D24 adjacent to the blower 26. The water storage chambers D11-D14, D21-D24 will be described later.

The backflow prevention rib 126h includes a portion, which extends from the one side of the air conditioning case 12 to the center of the air conditioning case 12, and a portion, which extends along the outer peripheral portion 128. More specifically, a distance between the backflow prevention rib 126h and the drain port 129 in the front-rear direction decreases as the backflow prevention rib 126h extends from the one side of the air conditioning case 12 to the center of the air conditioning case 12. The backflow prevention rib 126h and the outer peripheral portion 128 are spaced from each other by about several millimeters, and therefore defining a gap therebetween.

The backflow prevention rib 126i includes a portion, which extends from the other side of the air conditioning case 12 to the center of the air conditioning case 12, and a portion, which extends along the outer peripheral portion 128. More specifically, a distance between the backflow prevention rib 126i and the drain port 129 in the front-rear direction decreases as the backflow prevention rib 126i extends from the other side of the air conditioning case 12 to the center of the air conditioning case 12. The backflow prevention rib 126i and the outer peripheral portion 128 are spaced from each other by about several millimeters, and therefore defining a gap therebetween.

The core 161 of the evaporator 16 includes an upstream surface in the flow direction of the air flowing through the air conditioning case 12. The backflow prevention ribs 126a-126i are located below a virtual line that extends from the boundary S, which is defined in the bottom surface 120 of the air conditioning case 12, to a lower end of the upstream surface of the core 161.

Further, each of the backflow prevention ribs 126a-126i includes an upstream end and a downstream end in the flow direction of the air flowing through the air conditioning case 12, and the upstream portion is located above the downstream portion.

The backflow prevention ribs 126a, 126b, 126d-126i each include one lateral end adjacent to the center of the air conditioning case 12 in the width direction and the other lateral end adjacent to the side of the air conditioning case 12 in the width direction so that the one lateral end is located below the other lateral end. In contrast, the backflow prevention rib 126c includes one lateral end adjacent to the center of the air conditioning case 12 in the width direction and the other lateral end adjacent to the side of the air conditioning case 12 in the width direction so that the one lateral end is located above the other lateral end.

The backflow prevention ribs 126a-126i define a plurality of water storage chambers D11-D14, D21-D24 in the drain path that have a multistage structure and store the condensed water flowing backward toward the blower 26. The water storage chambers D11-D14, D21-D24 are in communication with each other through the gaps that are defined among the plurality of water storage chambers D11-D14, D21-D24. The gaps allow the condensed water, which flows backward toward the blower 26, to flow through the water storage chambers D11-D14, D21-D24 from the drain port 129 toward the blower 26 sequentially from one of the water storage chambers D11-D14, D21-D24 adjacent to the drain port 129 toward another of the water storage chambers D11-D14, D21-D24 adjacent to the blower 26.

The air inflow prevention rib 127 is configured to prevent air from flowing to a lower end of the core 161 of the evaporator 16. A tip portion of the air inflow prevention rib 127 is provided with a rubber member. The air inflow prevention rib 127 together with the rubber member suppresses an inflow of air to the lower end of the core 161 of the evaporator 16. As such, when the condensed water is stored in the lower end of the core 161 of the evaporator 16, the condensed water is prevented from flowing out from the air outlets 131, 132 with the air flowing through the air conditioning case 12. The air inflow prevention rib 127 is also configured to prevent the condensed water from leaking to an outside of the air conditioning case 12 from a portion of the bottom surface 120 where the left case and the right case are engaged.

The drain paths will be described hereafter in detail. As described above, the bottom surface 120 of the air conditioning case 12 defines the drain paths extending from the boundary S between the blower 26 and the air conditioning case 12 to the drain port 129. The drain paths are inclined downward toward the drain port 129. As such, when the condensed water is stored on the bottom surface 120 of the air conditioning case 12 while the vehicle travels along a smooth road, the condensed water flows to the drain port 129 via a drain path $R_{w1}$ or a drain path $R_{w2}$ shown in FIG. 7 and FIG. 8.

The drain path $R_{w1}$ guides the condensed water to the drain port 129 via the gap between the backflow prevention rib 126a and the backflow prevention rib 126c, the gap between the backflow prevention rib 126c and the backflow prevention rib 126d, the gap between the backflow prevention rib 126d and the outer peripheral portion 128, the gap between the backflow prevention rib 126f and the backflow prevention rib 126h, the gap between the backflow prevention rib 126h and the outer peripheral portion 128, and a gap between the air inflow prevention rib 127 and the one side of the air conditioning case 12 in the width direction in this order.

The drain path $R_{w2}$ guides the condensed water to the drain port 129 via the gap between the backflow prevention rib 126b and the backflow prevention rib 126c, the gap between the backflow prevention rib 126c and the backflow prevention rib 126e, the gap between the backflow prevention rib 126e and the outer peripheral portion 128, the gap between the backflow prevention rib 126g and the backflow prevention rib 126i, the gap between the backflow prevention rib 126i and the outer peripheral portion 128, and a gap between the air inflow prevention rib 127 and the other side of the air conditioning case 12 in the width direction in this order.

As described above, the drain path $R_{w1}$ and the drain path $R_{w2}$ each are inclined downward toward the drain port 129 in the air conditioning unit 10. As such, the condensed water is drained from the drain port 129 even when the vehicle travels on a down grade. In addition, since the condensed water is removed from the air conditioning case 12 promptly, occurrence of strange smell can be suppressed.

Here, when the vehicle is braked suddenly or when the vehicle is turned quickly, large amount of the condensed water remained in the evaporator 16 may fall to the bottom surface 120 of the air conditioning case 12 and may flow backward toward the blower 26.

A flow of the condensed water flowing backward toward the blower 26 will be described in detail with reference to FIG. 3. For example, when the vehicle is braked suddenly or when the vehicle is turned quickly, large amount of the condensed water remained in the evaporator 16 may fall to the bottom surface 120 of the air conditioning case 12, i.e., may fall into the water storage chamber D11 proximate to the drain port 129. In this case, the condensed water is trapped by the water storage chamber D11 without flowing to the blower 26.

When the water storage chamber D11 is filled with the condensed water, the condensed water flows from the water storage chamber D11 to the water storage chamber D12 via the gap between the backflow prevention rib 126f and the outer peripheral portion 128. At this time, the backflow prevention rib 126f guides the condensed water, after passing through the gap between the backflow prevention rib 126f and the outer peripheral portion 128, to flow into the water storage chamber D12 not into the water storage chamber D13.

When the water storage chamber D12 is filled with the condensed water, the condensed water flows from the water storage chamber D12 to the water storage chamber D13 via the gap between the backflow prevention rib 126d and the outer peripheral portion 128. When the water storage chamber D13 is filled with the condensed water, the condensed water flows from the water storage chamber D13 to the water storage chamber D14 via the gap between the backflow prevention rib 126c and the backflow prevention rib 126d.

As described above, the bottom surface 120 of the air conditioning case 12 is provided with the backflow prevention ribs 126a-126i that are configured to trap the condensed water flowing through the water storage chambers D11-D14, D21-D24 from the drain port 129 toward the blower 26 sequentially from one of the water storage chambers D11-D14, D21-D24 adjacent to the drain port 129 toward another of the water storage chambers D11-D14, D21-D24 adjacent to the blower 26. As such, the condensed water can be stored until all of the water storage chambers D11-D14, D21-D24 are filled with the condensed water, and therefore the cause of the backflow of the condensed water can be suppressed.

Figure 11:
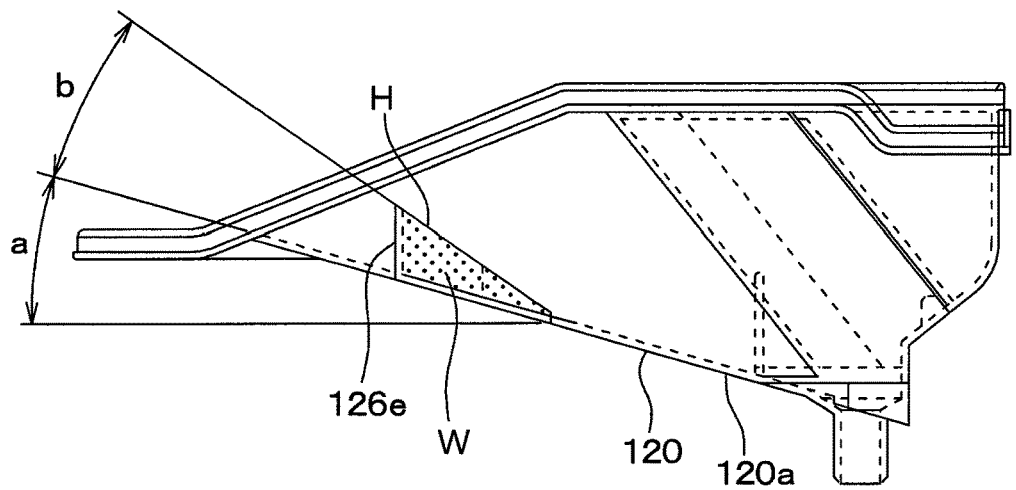
FIG. 11 is a bottom view of the backflow prevention rib, shown in FIG. 9, storing the condensed water.

A height of the rib will be described hereafter with reference to the backflow prevention rib 126e shown in FIG. 9 to FIG. 11. FIG. 9 is a diagram showing a backflow prevention rib 126e, which is provided in the bottom surface 120 of the air conditioning case 12, preventing condensed water from flowing backward toward the blower 26. FIG. 10 is a right view showing the condensed water and the backflow prevention rib 126e shown in FIG. 9. FIG. 11 is a bottom view showing the condensed water and the backflow prevention rib 126e shown in FIG. 9.

As shown in FIG. 9, the backflow prevention rib 126e is inclined to the width direction of the air conditioning case 12 at an inclination angle $\theta$ equal to an angle c ($\theta=c$). Since the backflow prevention rib 126e is inclined to the width direction of the air conditioning case 12 at the inclination angle $\theta$ (e.g., $\theta=c$), a water level of the condensed water W trapped by the backflow prevention rib 126e when the vehicle is braked suddenly becomes not horizontal. Specifically, as shown in FIG. 10, the water level inclined upward from a side adjacent to the center of the air conditioning case 12 in the width direction toward a side adjacent to the other side of the air conditioning case 12 in the width direction. The inclination angle $\theta$ of the water level of the condensed water W relative to the horizontal plane is expressed as $\theta=d$.

As such, the height of the backflow prevention rib 126e lowers from the other side of the air conditioning case 12 toward the center of the air conditioning case 12 along the width direction with the inclination angle $\theta$ equal to an angle d (i.e., $\theta=d$). Thus, the height of the backflow prevention rib 126e adjacent to the center of the air conditioning case 12 in the width direction can be lower. As a result, the ventilation resistance of the air flowing through the air conditioning case 12 can be reduced more efficiently.

As shown in FIG. 9, the backflow prevention rib 126e is inclined to the width direction of the air conditioning case 12 at the inclination angle $\theta$ equal to the angle c ($\theta=c$). Specifically, the backflow prevention rib 126e is inclined so that an end of the backflow prevention rib 126e adjacent to the center of the air conditioning case 12 is located between the drain port 129 and an end of the backflow prevention rib 126e adjacent to the one side of the air conditioning case 12 along the front-rear direction. Accordingly, the backflow prevention rib 126e is configured to guide the condensed water to the drain port 129. For example, when the vehicle turns, the condensed water may flow to the drain port 129 along the backflow prevention rib 126e extending along the width direction of the air conditioning case 12.

Further, as shown in FIG. 11, the bottom surface 120 of the air conditioning case 12 inclines to the horizontal plane at the inclination angle $\theta$ equal to an angle a (i.e., $\theta=a$). In a situation where the vehicle is braked at a specified deceleration rate, the water level of the condensed water W trapped by the backflow prevention rib 126e is inclined so that a downstream end of the water level in the flow direction of the air flowing along the bottom surface 120 of the air conditioning case 12 in the air conditioning case 12 is located below an upstream end of the water level in the flow direction. The inclination angle $\theta$ of the water level of the condensed water W relative to the bottom surface 120 of the air conditioning case 12 is expressed as $\theta=b$.

That is, the water level of the condensed water W trapped by the backflow prevention rib 126e when the vehicle is braked at the specified deceleration rate is inclined to the horizontal plane at the inclination angle $\theta$ equal to a summation of the angle a and the angle b (i.e., $\theta=a+b$).

As such, the height of the backflow prevention rib 126e is inclined downward from the upstream end to the downstream end at the inclination angle $\theta$ equal to the summation of the angle a and the angle b (i.e., $\theta=a+b$) relative to the horizontal plane. Therefore, when the vehicle is braked at the specified deceleration rate, the backflow prevention rib 126e can back up the condensed water maximally and can reduce the ventilation resistance of the air flowing through the air conditioning case 12.

Thus, the height of the backflow prevention rib 126e is lowered from the upstream end toward the downstream end along the flow direction of the air flowing through the air conditioning case 12. As such, in the above-described configuration, the bottom surface 120 of the air conditioning case 12 defines the drain paths extending from the boundary S between the blower 26 and the air conditioning case 12 to the drain port. The drain paths are inclined downward toward the drain port 129. Here, the width direction of the bottom surface 120 of the air conditioning case 12 is defined as the width direction of the air conditioning case 12 intersecting with the main flow direction of air flowing through the air conditioning case 12. The backflow prevention ribs 126a-126i protrude from the bottom surface 120 of the air conditioning case 12 to extend along a direction intersecting with the width direction of the air conditioning case 12. The backflow prevention ribs 126a-126i are configured to guide the condensed water to the drain port 129 and to suppress the cause of the backflow of the condensed water toward the blower 26. As such, the condensed water can be drained certainly while a cause of a backflow of the condensed water toward the blower is suppressed. In addition, the core includes an upstream surface in a flow direction of the air flowing through the air conditioning case. The backflow prevention rib is located below a virtual line that extends from the boundary, which is defined in the bottom surface of the air conditioning case, to a lower end of the upstream surface of the core. As a result, a volume of air supplied into the vehicle compartment can be prevented from being reduced.

Further, each of the backflow prevention ribs 126a-126i include the upstream end and the downstream end in the flow direction of the air flowing through the air conditioning case 12, and the downstream portion is located below the upstream portion.

As such, the backflow prevention ribs 126a-126i can secure a volume of the condensed water, which is trapped and prevented from flowing backward toward the blower 26, and can reduce the ventilation resistance of the air flowing through the air conditioning case 12.

The backflow prevention ribs 126a-126i include the backflow prevention ribs 126a, 126b, 126d, 126e, 126h, 126i that each include the one lateral end adjacent to the center of the air conditioning case 12 in the width direction and the other lateral end adjacent to the side of the air conditioning case 12 in the width direction so that the other lateral end is located above the one lateral end.

As such, the backflow prevention ribs 126a-126i can secure the volume of the condensed water, which is trapped and prevented from flowing backward toward the blower 26, and can reduce the ventilation resistance of the air flowing through the air conditioning case 12.

The backflow prevention ribs 126a-126i define a plurality of water storage chambers D11-D14, D21-D24 in the drain path that have a multistage structure and store the condensed water flowing backward toward the blower 26. The water storage chambers D11-D14, D21-D24 are in communication with each other through the gaps that are defined among the plurality of water storage chambers D11-D14, D21-D24. The gaps allow the condensed water, which flows backward toward the blower 26, to flow through the water storage chambers D11-D14, D21-D24 from the drain port 129 toward the blower 26 sequentially from one of the water storage chambers D11-D14, D21-D24 adjacent to the drain port 129 toward another of the water storage chambers D11-D14, D21-D24 adjacent to the blower 26.

As such, the condensed water can be stored in all of the water storage chambers D11-D14, D21-D24, and therefore the cause of the backflow of the condensed water can be suppressed.

The backflow prevention rib 126f together with the backflow prevention rib 126g serves as the guide rib that is configured to guide the condensed water, which flows backward toward the blower 26 through a plurality of water storage chambers D11-D14, D21-D24 sequentially from one of the water storage chambers D11-D14, D21-D24 adjacent to the drain port 129 to another one of the water storage chambers D11-D14, D21-D24 adjacent to the blower 26.

Accordingly, the backflow prevention rib 126f together with the backflow prevention rib 126g can guide the condensed water, which flows backward toward the blower 26 through a plurality of water storage chambers D11-D14, D21-D24 sequentially from one of the water storage chambers D11-D14, D21-D24 adjacent to the drain port 129 to another one of the water storage chambers D11-D14, D21-D24 adjacent to the blower 26.

The evaporator 16 includes the second header tank 163 defining the bottom end of the core 161. The second header tank 163 is inclined toward the downstream side of the core 161 in the flow direction of air. The drain path is inclined downward toward the drain port 129 in a projection region in which an upstream surface of the core 161 in the flow direction of the air flowing through the air conditioning case 12 is projected downward from an upper side of the upstream surface of the core 161. The backflow prevention ribs 126a-126i are formed in a multistage structure in which the backflow prevention ribs 126a-126i are arranged one another in the projection region along the flow direction of the air flowing through the air conditioning case 12.

Accordingly, the evaporator 16 includes the second header tank 163 defining the bottom end of the core 161, and the second header tank 163 is inclined toward the downstream side of the core 161 along the flow direction of air. As such, the dimension of the air conditioning case 12 in the up-down direction can be small, and therefore the interior space of the vehicle compartment can be large. Further, the drain path is inclined downward toward the drain port 129, and the backflow prevention ribs 126a-126i are formed in a multistage structure in which the backflow prevention ribs 126a-126i are arranged one another in the projection region along the flow direction of the air flowing through the air conditioning case 12. As such, the condensed water can be certainly prevented from flowing backward toward the blower 26.

Second Embodiment

Figure 12:
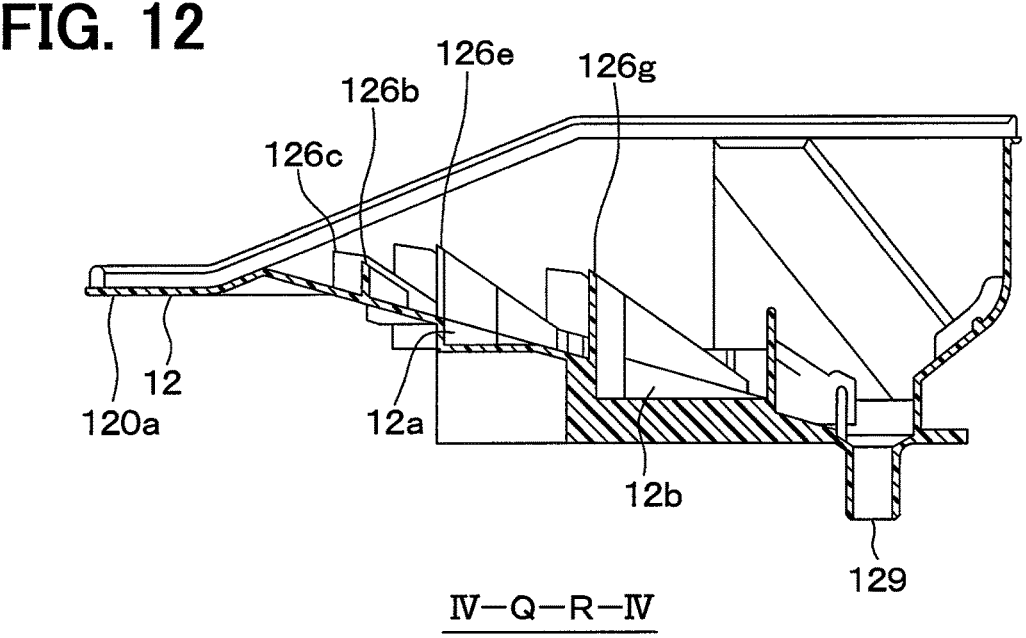
FIG. 12 is a cross-sectional view schematically illustrating an air conditioning unit for a vehicle in a second embodiment, and corresponding to a cross-sectional view taken along line II-II shown in FIG. 1.

The air conditioning unit 10 for a vehicle in a second embodiment will be described hereafter with reference to FIG. 12. The air conditioning unit 10 in the present embodiment is different from the air conditioning unit 10 in the above-described first embodiment in a point that the bottom surface 120 of the air conditioning case 12 includes recessed portions 12a, 12b correspondingly to the water storage chambers D11-D14, D21-D24.

The recessed portion 12a is defined correspondingly to the water storage chamber D22 between the backflow prevention rib 126e and the backflow prevention rib 126i. The recessed portion 12b is defined correspondingly to the water storage chamber D22 between the backflow prevention rib 126i and the air inflow prevention rib 127. Bottom surfaces defining the recessed portion 12a and the recessed portion 12b respectively are horizontal when the vehicle is horizontal.

Since the bottom surface 120 of the air conditioning case 12 includes the recessed portions 12a, 12b correspondingly to the water storage chambers D11-D14, D21-D24 as described above, the condensed water flowing backward toward the blower 26 can be trapped more efficiently.

The present embodiment can achieve the effects and advantages, which are obtained from the common structure common to the first embodiment.

Moreover, since the bottom surface 120 of the air conditioning case 12 includes the recessed portions 12a, 12b correspondingly to the water storage chambers, larger volume of the condensed water can be stored, and therefore the cause of the backflow of the condensed water can be suppressed more certainly.

Third Embodiment

Figure 13:
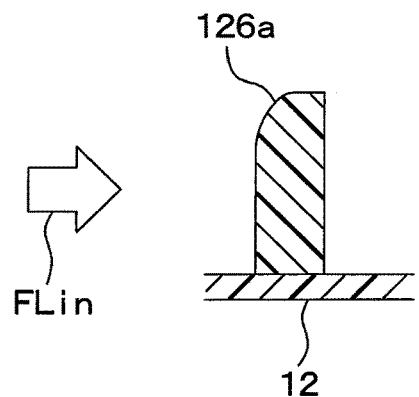
FIG. 13 is a cross-sectional view of the backflow prevention rib in an example modification.

The air conditioning unit 10 for a vehicle in a third embodiment will be described hereafter with reference to FIG. 13. In the above-described embodiments, the backflow prevention ribs 126a-126i each has a rectangular shape in cross section. In contrast, in the present embodiment, the backflow prevention ribs 126a-126i each include a protrusion end of which upstream corner in the flow direction of air flowing through the air conditioning case 12 is chamfered to have a curved shape as shown in FIG. 13.

Since the backflow prevention ribs 126a-126i each include the protrusion end of which upstream corner in the flow direction of air flowing through the air conditioning case 12 is chamfered to have the curved shape as described above, wind noise caused by the air flowing through the air conditioning case 12 can be reduced.

The present embodiment can achieve the effects and advantages, which are obtained from the common structure common to the first embodiment.

In addition, since the backflow prevention ribs 126a-126i each include the protrusion end of which upstream corner in the flow direction of air flowing through the air conditioning case 12 is chamfered to have a curved shape as described above, wind noise caused by the air flowing through the air conditioning case 12 can be reduced.

Other Embodiments (1) In the above-described embodiments, the evaporator 16 is inclined to the bottom surface 120 of the air conditioning case 12. However, the evaporator 16 may be arranged perpendicularly to the bottom surface 120 of the air conditioning case 12.

(2) In the above-described third embodiment, the backflow prevention ribs 126a-126i each include the protrusion end of which upstream corner in the flow direction of air flowing through the air conditioning case 12 is chamfered to have a curved shape. However, the upstream corner of the protrusion end may be chambered linearly. Alternatively, the backflow prevention ribs 126a-126i each may include the protrusion end of which downstream corner in the flow direction of air flowing through the air conditioning case 12 is chamfered.

(3) In the above-described embodiments, each of the backflow prevention ribs 126a-126i includes the upstream end and the downstream end in the flow direction of the air flowing through the air conditioning case 12 so that the downstream portion is located below the upstream portion. However, each of the backflow prevention ribs 126a-126i may include the upstream end and the downstream end in the flow direction of the air flowing through the air conditioning case 12 so that the downstream portion is located above the upstream portion.

The present disclosure is not limited to the above-described embodiments, and can be appropriately modified. Individual elements or features of a particular embodiment are generally not limited to that particular embodiment, but, where applicable, are interchangeable and can be used in a selected embodiment, even if not specifically shown or described. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above-described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

CONCLUSION

In a first aspect regarding a part of or a whole of the above-described embodiments, the air conditioning unit in the center console positioned in the vehicle compartment includes an air conditioning case that defines the air passage therein allowing air to flow therethrough toward the vehicle compartment. The air conditioning unit further includes a blower, a cooler, and a drain port. The blower is configured to supply air into the air passage. The cooler includes a core that is configured to cool the air flowing through the air conditioning case. The drain port is defined in a bottom surface of the air conditioning case and is configured to drain the condensed water, which is generated in the cooler, from the air conditioning case. The bottom surface of the air conditioning case defines the drain path extending from the boundary between the blower and the air conditioning case to the drain port. The drain path is inclined downward toward the drain port. In addition, the backflow prevention rib protrudes from the bottom surface of the air conditioning case to extend along a direction intersecting with a width direction of the air conditioning case. The backflow prevention rib is configured to guide the condensed water to the drain port and suppress a cause of a backflow of the condensed water toward the blower. The core includes an upstream surface in a flow direction of the air flowing through the air conditioning case. The backflow prevention rib is located below a virtual line that extends from the boundary, which is defined in the bottom surface of the air conditioning case, to a lower end of the upstream surface of the core.

In a second aspect, the plurality of backflow prevention ribs include some backflow prevention ribs that each include the one lateral end adjacent to the center of the air conditioning case in the width direction and the other lateral end adjacent to the side of the air conditioning case in the width direction so that the one lateral end is located below the other lateral end. As such, the backflow prevention ribs can secure the volume of the condensed water, which is trapped and prevented from flowing backward toward the blower, and can reduce the ventilation resistance of the air flowing through the air conditioning case.

In a third aspect, the plurality of backflow prevention ribs include some backflow prevention ribs that each include the one lateral end adjacent to the center of the air conditioning case in the width direction and the other lateral end adjacent to the side of the air conditioning case in the width direction so that the one lateral end is located below the other lateral end. As such, the backflow prevention ribs can secure the volume of the condensed water, which is trapped and prevented from flowing backward toward the blower, and can reduce the ventilation resistance of the air flowing through the air conditioning case.

In a fourth aspect, the backflow prevention ribs define the water storage chambers in the drain path that have a multistage structure and store the condensed water flowing backward toward the blower. The water storage chambers are in communication with each other through the gaps that are defined among the plurality of water storage chambers. The gaps allow the condensed water, which flows backward toward the blower, to flow through the water storage chambers from the drain port toward the blower sequentially from one of the water storage chambers adjacent to the drain port toward another of the water storage chambers adjacent to the blower. As such, the condensed water can be stored in all of the water storage chambers, and therefore the cause of the backflow of the condensed water can be suppressed.

In a fifth aspect, the backflow prevention rib includes the guide rib that guides the condensed water, which flows backward toward the blower, to flow through the plurality of water storage chambers from the drain port toward the blower sequentially. Accordingly, the condensed water, which flows backward toward the blower, can be guided to flow through the plurality of water storage chambers from the drain port toward the blower sequentially.

In a sixth aspect, the bottom surface of the air conditioning case includes the recessed portions correspondingly to the water storage chambers. Accordingly, larger volume of the condensed water can be stored in the recessed portions. As such, larger volume of the condensed water can be stored without reaching the blower.

In a seventh aspect, the backflow prevention rib includes the protrusion end of which upstream corner in the flow direction is chamfered. Accordingly, wind noise, which is caused when air flowing through the air conditioning case 12 collides with the backflow prevention rib, can be reduced.

In an eighth aspect, the cooler includes the bottom portion defining the bottom end of the core, and the bottom end is inclined toward the downstream side of the core in the flow direction of air. The drain path is inclined downward toward the drain port in a projection region in which an upstream surface of the core in the flow direction of the air flowing through the air conditioning case is projected downward from an upper side of the upstream surface of the core. Further, the backflow prevention ribs are formed in a multistage structure in which the backflow prevention ribs are arranged one another in the projection region along the flow direction of the air flowing through the air conditioning case.

Accordingly, since the cooler is arranged so that the bottom portion thereof is inclined toward the downstream side of the core, the dimension of the air conditioning case in the up-down direction can be decreased. As a result, the interior space of the vehicle compartment can be secured large. The drain path is inclined downward toward the drain port. Further, the backflow prevention ribs are formed in a multistage structure in which the backflow prevention ribs are arranged one another in the projection region along the flow direction of the air flowing through the air conditioning case. As such, the condensed water can be drained certainly while a cause of a backflow of the condensed water toward the blower is suppressed.

What is claimed is:

1. An air conditioning unit for a vehicle, the air conditioning unit capable of being positioned in a center console of a vehicle compartment, the air conditioning unit comprising:
    an air conditioning case that defines an air passage therein through which air flows toward the vehicle compartment;
    a blower that is configured to supply the air into the air passage;
    a cooler in the air conditioning case, the cooler including a core that is configured to cool the air flowing through the air conditioning case; and
    a drain port that is defined in a bottom surface of the air conditioning case and that is configured to drain a condensed water, which is generated in the cooler, from the air conditioning case, wherein
    the bottom surface of the air conditioning case defines a drain path extending from a boundary between the blower and the air conditioning case to the drain port, the drain path being inclined downward toward the drain port,
    the bottom surface of the air conditioning case is provided with a backflow prevention rib that is configured to guide the condensed water to the drain port and to block a backflow of the condensed water toward the blower,
    when a width direction of the bottom surface of the air conditioning case is defined to be perpendicular to a main flow direction of the air flowing through the air conditioning case, the backflow prevention rib protrudes from the bottom surface to extend along a direction intersecting with the width direction,
    the core includes an upstream surface in a flow direction of the air flowing through the air conditioning case,
    the backflow prevention rib is located below a virtual line that extends from the boundary, which is defined in the bottom surface of the air conditioning case, to a lower end of the upstream surface of the core,
    the backflow prevention rib defines a plurality of water storage chambers in the drain path that have a multistage structure and that store the condensed water flowing backward toward the blower,
    the plurality of water storage chambers are in communication with each other through a plurality of gaps that are defined among the plurality of water storage chambers,
    the plurality of gaps allow the condensed water, which flows backward toward the blower, to flow through the plurality of water storage chambers from the drain port toward the blower sequentially, and
    each of the plurality of water storage chambers is configured to trap the condensed water therein.

2. The air conditioning unit for a vehicle according to claim 1, wherein
    the backflow prevention rib includes a downstream end and an upstream end in the flow direction of the air flowing through the air conditioning case, and
    the downstream end is located below the upstream end.

3. The air conditioning unit for a vehicle according to claim 1, wherein
    the backflow prevention rib includes a rib, the rib including one lateral end adjacent to a center of the air conditioning case in the width direction and an other lateral end adjacent to a side of the air conditioning case in the width direction, and
    the one lateral end is located below the other lateral end.

4. The air conditioning unit for a vehicle according to claim 1, wherein
    the backflow prevention rib is a plurality of ribs, and
    the plurality of ribs include a guide rib that is configured to guide the condensed water, which flows backward toward the blower, to flow through the plurality of water storage chambers from the drain port toward the blower sequentially.

5. The air conditioning unit for a vehicle according to claim 1, wherein
    the bottom surface of the air conditioning case includes a plurality of recessed portions correspondingly to the plurality of water storage chambers.

6. The air conditioning unit for a vehicle according to claim 1, wherein
    the backflow prevention rib includes a sloping side that is formed by chamfering an upstream side corner of the backflow prevention rib in the flow direction.

7. The air conditioning unit for a vehicle according to claim 1, wherein
    the cooler includes a bottom portion that defines a bottom end of the core and that is inclined toward a downstream side of the core in the flow direction of the air,
    the drain path is inclined downward toward the drain port in a projection region in which an upstream surface of the core in the flow direction of the air flowing through the air conditioning case is projected downward from an upper side of the upstream surface of the core, and
    the backflow prevention rib is a plurality of ribs in a multistage structure in which the plurality of ribs are arranged one another in the projection region along the flow direction of the air flowing through the air conditioning case.

8. The air conditioning unit for a vehicle according to claim 1, wherein the plurality of water storage chambers are defined by the backflow prevention rib and the bottom surface of the air conditioning case.

* * * * *